United States Patent
Wong et al.

(10) Patent No.: US 10,199,949 B1
(45) Date of Patent: Feb. 5, 2019

(54) ACTIVE-CLAMP FLYBACK CIRCUIT AND CONTROL METHOD THEREOF

(71) Applicant: JOULWATT TECHNOLOGY (HANGZHOU) CO., LTD., Hangzhou (CN)

(72) Inventors: Pitleong Wong, Hangzhou (CN); Xunwei Zhou, Hangzhou (CN)

(73) Assignee: JOULWATT TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 15/950,192

(22) Filed: Apr. 11, 2018

(30) Foreign Application Priority Data

Oct. 27, 2017 (CN) .......................... 2017 1 1026155

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 2001/0054* (2013.01)

(58) Field of Classification Search
CPC ............... H02M 3/33569; H02M 1/08; H02M 2001/0054
See application file for complete search history.

(56) References Cited

U.S. PATENT DOCUMENTS

| | | | | |
|---|---|---|---|---|
| 5,570,278 A | * | 10/1996 | Cross | H02M 3/33569 363/131 |
| 8,009,448 B2 | * | 8/2011 | Liu | H02M 3/33569 363/21.01 |
| 9,614,447 B2 | * | 4/2017 | Liu | H02M 3/33515 |
| 2017/0207708 A1 | * | 7/2017 | Hari | H02M 3/33507 |

* cited by examiner

*Primary Examiner* — Emily P Pham
(74) *Attorney, Agent, or Firm* — Perkins Coie LLP

(57) ABSTRACT

The present invention provides an active-clamp flyback circuit and a control method thereof. The active-clamp flyback circuit includes a flyback switching power supply, and further includes a first capacitor and a first switch tube. One end of the first capacitor is connected with a high potential end of an input power supply, the other end is connected with a first end of the first switch tube, and a second end of the first switch tube is connected with a common end of the main power switch tube and the primary winding. A turn-off moment of the first switch tube is adjusted according to time when the main power switch tube is turned on and the first switch tube is turned off and voltages at both ends of the magnetizing inductor. The present invention can reduce the turn-on loss of the main power switch tube.

17 Claims, 2 Drawing Sheets

_US 10,199,949 B1_

ACTIVE-CLAMP FLYBACK CIRCUIT AND CONTROL METHOD THEREOF

CROSS-REFERENCE TO RELATED APPLICATIONS

This Non-provisional application claims priority under 35 U.S.C. § 119(a) on Patent Application No(s). 201711026155.2 filed in People's Republic of China on Oct. 27, 2017, the entire contents of which are hereby incorporated by reference.

BACKGROUND OF THE INVENTION

Field of the Invention

The present invention relates to a technical field of power electronics, and more particularly, to an active-clamp flyback circuit and a control method thereof.

Description of the Related Art

A flyback switching power supply is an isolating switching power supply, which is widely used in AC/DC and DC/DC conversion, and provides insulation isolation between an input stage and an output stage. The flyback switching power supply includes a main power switch tube, a transformer and a secondary rectifier tube, and the transformer includes a primary winding and a secondary winding. The main power switch tube is connected with the primary winding, and the secondary rectifier tube is connected with the secondary winding. The primary control circuit controls a switching state of the main power switch tube, and the secondary rectifier tube located at the secondary is turned on to freewheeling after the main power switch tube is turned off.

An active-clamp topology is to connect a capacitor to a drain of the main power switch tube of the flyback switching power supply, a switch tube is connected between the drain of the main power switch tube and the capacitor, and the capacitor is connected with an input power supply. When the main power switch tube is turned on and then turned off, at an instant that the drain is turn-off and an instant that a waveform is turned off, a peak and a high order harmonic are coupled to the power supply through the capacitor to achieve the purpose of clamping a drain voltage of the main power switch tube, and a turn-off loss of the main power switch tube is reduced, thereby reducing a power consumption of the switching power supply.

FIG. 1 illustrates an active-clamp flyback circuit. When a system is working at a boundary conduction mode (BCM) or a discontinuous conduction mode (DCM), at the beginning of each switch period, a magnetization current is close to zero. In the prior art, the switch tube MA is generally controlled to be turned on and off by the way shown in FIG. 2. The switch tube MA is turned off when the main power switch tube M0 is turned on, and the switch tube MA is turned on when the main power switch tube M0 is turned off. $L_M$ is magnetizing inductor in the primary winding. In the prior art, a control way in FIG. 2 is used to control the turn-off of the switch tube MA. Because there is no accurate control to a turn-off moment of the switch tube MA before the main power switch tube M0 is turned on, a technical problem of too large of an negative current through $L_M$ which increases a conduction loss may occur. Moreover, BCM and DCM modes differ in whether the negative current is required or not, which is not determined and controlled by the prior art.

BRIEF SUMMARY OF THE INVENTION

In view of this, an objective of the present invention is to provide an active-clamp flyback circuit to reduce the turn-on loss of the main power switch tube by controlling the turn-off moment of the switch tube, and solves the technical problem that the turn-on loss of the main power switch tube in the prior art is large.

To achieve the above-mentioned objective, the present invention provides an active-clamp flyback circuit, including a main power switch tube, a transformer and a secondary rectifier tube. The transformer includes a primary winding and a secondary winding, and the primary winding includes magnetizing inductor. The main power switch tube is connected with the primary winding, and the secondary rectifier tube is connected with the secondary winding. A primary control circuit controls a switching state of the main power switch tube, and the secondary rectifier tube is turned on to freewheeling after the main power switch tube is turned off;

The active-clamp flyback circuit further includes a first capacitor and a first switch tube. One end of the first capacitor is connected with a high potential end of an input power supply, the other end is connected with a first end of the first switch tube, and a second end of the first switch tube is connected with a common end of the main power switch tube and the primary winding;

A working mode of the active-clamp flyback circuit is determined. If work is in a boundary conduction mode or a discontinuous conduction mode, a turn-off moment of the first switch tube is adjusted according to time when the main power switch tube is turned on and the first switch tube is turned off and voltages at both ends of the magnetizing inductor.

Optionally, the active-clamp flyback circuit may further include a switch tube control circuit configured to control turn-off of the first switch tube, and the switch tube control circuit may include a second capacitor configured to detect the voltages at both ends of the magnetizing inductor and to obtain a current signal representing the voltages at both ends of the magnetizing inductor. The current signal may charge to the second capacitor during a period when the main power switch tube is turned on and the first switch tube is turned off, and the current signal may discharge to the second capacitor when the main power switch tube is turned off and the first switch tube is turned on. During the discharging process, when a voltage of the second capacitor drops to a reference signal, the first switch tube may be controlled to be turned off.

Optionally, time from the turn-off moment of the first switch tube to a turn-on moment of the main power switch tube may be first time. When the first time reaches threshold time, the active-clamp flyback circuit may be determined to work in the discontinuous conduction mode, otherwise, it may be the boundary conduction mode.

Optionally, when the active-clamp flyback circuit is working in the boundary conduction mode, after the first switch tube is turned off, a voltage or a voltage change rate of the common end of the main power switch tube and the primary winding may be detected. When the voltage of the common end of the main power switch tube and the primary winding reaches a corresponding threshold or the voltage change rate of the common end of the main power switch tube and the primary winding reaches a corresponding threshold after a period of time, a turn-off moment of a next cycle of the first switch tube may be advanced or delayed.

Optionally, the switch tube control circuit may further include an auxiliary winding, a first resistor and a comparison circuit. The auxiliary winding may be coupled with the transformer, the first resistor may be connected with the auxiliary winding to sample a voltage of the auxiliary winding, and a voltage of the first resistor may characterize the voltages at both ends of the magnetizing inductor. A current of the first resistor may be sampled to obtain the current signal representing the voltages at both ends of the magnetizing inductor. The current signal may be input to the second capacitor, a voltage of the second capacitor may be input to a first input end of a comparison circuit, and the reference signal may be input to a second input end of the comparison circuit. An output end of the comparison circuit may be connected to a control end of the first switch tube.

Optionally, after the first switch tube is turned off and before the main power switch tube is turned on, voltages at both ends of the second capacitor may be kept to be equal to an initial voltage.

Optionally, when the voltage or the voltage change rate of the common end of the main power switch tube and the primary winding is lower than the corresponding threshold, the turn-off moment of the first switch tube may be advanced by amplifying the reference signal; and when the voltage or the voltage change rate of the common end of the main power switch tube and the primary winding is higher than the corresponding threshold, the turn-off moment of the first switch tube may be delayed by reducing the reference signal.

Optionally, when the voltage or the voltage change rate of the common end of the main power switch tube and the primary winding is lower than the corresponding threshold, the turn-off moment of the first switch tube may be advanced by reducing capacitance of the second capacitor or increasing a discharging current of the second capacitor; and when the voltage or the voltage change rate of the common end of the main power switch tube and the primary winding is higher than the corresponding threshold, the turn-off moment of the first switch tube may be delayed by increasing the second capacitor or reducing the discharging current of the second capacitor.

The present invention further provides a control method for an active-clamp flyback circuit, based on the active-clamp flyback circuit. The active-clamp flyback circuit includes a main power switch tube, a transformer and a secondary rectifier tube. The transformer includes a primary winding and a secondary winding, and the primary winding includes magnetizing inductor. The main power switch tube is connected with the primary winding, and the secondary rectifier tube is connected with the secondary winding. A primary control circuit controls a switching state of the main power switch tube, and the secondary rectifier tube is turned on to freewheeling after the main power switch tube is turned off.

The active-clamp flyback circuit further includes a first capacitor and a first switch tube. One end of the first capacitor is connected with a high potential end of an input power supply, the other end is connected with a first end of the first switch tube, and a second end of the first switch tube is connected with a common end of the main power switch tube and the primary winding.

A working mode of the active-clamp flyback circuit is determined. If the circuit is working in a boundary conduction mode or a discontinuous conduction mode, a turn-off moment of the first switch tube is adjusted according to time when the main power switch tube is turned on and the first switch tube is turned off and voltages at both ends of the magnetizing inductor.

Optionally, the active-clamp flyback circuit may further include a switch tube control circuit configured to control turn-off of the first switch tube, and the switch tube control circuit may include a second capacitor configured to detect the voltages at both ends of the magnetizing inductor and to obtain a current signal representing the voltages at both ends of the magnetizing inductor. The current signal may charge to the second capacitor during a period when the main power switch tube is turned on and the first switch tube is turned off, and the current signal may discharge to the second capacitor when the main power switch tube is turned off and the first switch tube is turned on. During the discharging process, when a voltage of the second capacitor drops to a reference signal, the first switch tube may be controlled to be turned off.

Optionally, time from the turn-off moment of the first switch tube to a turn-on moment of the main power switch tube may be first time. When the first time reaches threshold time, the active-clamp flyback circuit may be determined to work in the discontinuous conduction mode, otherwise, it may be the boundary conduction mode.

Optionally, when the active-clamp flyback circuit is working in the boundary conduction mode, after the first switch tube is turned off, a voltage or a voltage change rate of the common end of the main power switch tube and the primary winding may be detected. When the voltage of the common end of the main power switch tube and the primary winding reaches a corresponding threshold or the voltage change rate of the common end of the main power switch tube and the primary winding reaches a corresponding threshold after a period of time, a turn-off moment of a next cycle of the first switch tube may be advanced or delayed.

Compared with the prior art, the technical solution of the present invention has the following advantages: in the boundary conduction mode (BCM) or the discontinuous conduction mode (DCM), the turn-off moment of the first switch tube in the present invention being adjusted and controlled, which is beneficial to reduce the loss. Especially in the boundary conduction mode, the negative current is generated in the magnetizing inductor so that the common end (the drain of the main power switch tube) of the main power switch tube and the primary winding is discharged before the main power switch tube is turned on, so as to control the magnetizing inductor having a slight negative current, thereby reducing the turn-on loss, and also being beneficial to reduce the conduction loss.

DETAILED DESCRIPTION OF THE INVENTION

The preferable embodiment of the present invention is described in detail below with reference to the accompanying drawings, but the present invention is not limited thereto, and the present invention covers any alternatives, modifications, equivalent methods and solutions in the spirit and scope of the present invention.

In order to make the public have a thorough understanding of the present invention, the specific details are described in the following preferable embodiment of the present invention, and the present invention will be fully understood by those skilled in the art without descriptions of these details.

The present invention is described more specifically by way of example with reference to the accompanying drawings in the following paragraphs. It should be noted that all the accompanying drawings are in a simplified form and all of them are in non-accurate proportions, which are merely for conveniently and clearly illustrating the embodiment of the present invention.

Figure 1:
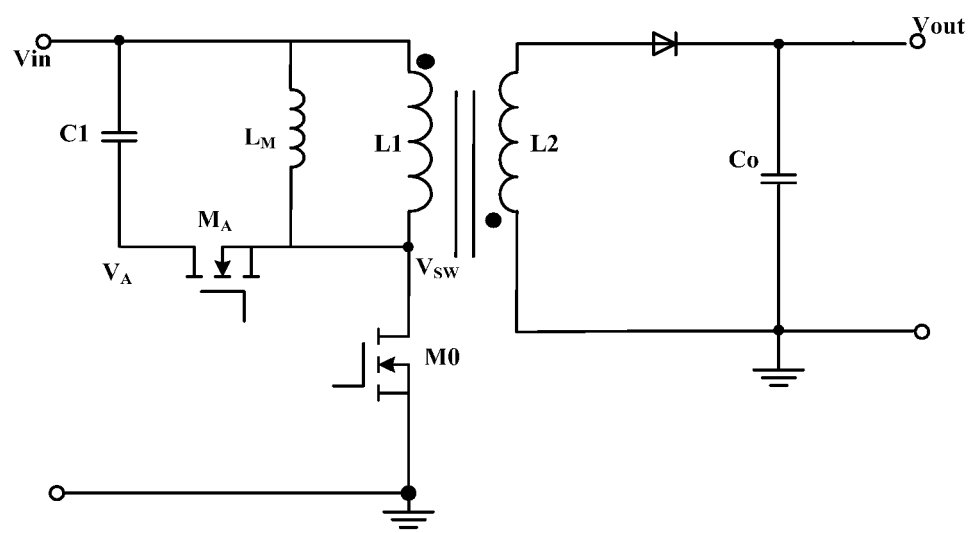
FIG. 1 is a schematic diagram of a circuit structure of an active-clamp flyback circuit in the prior art.
Figure 2:
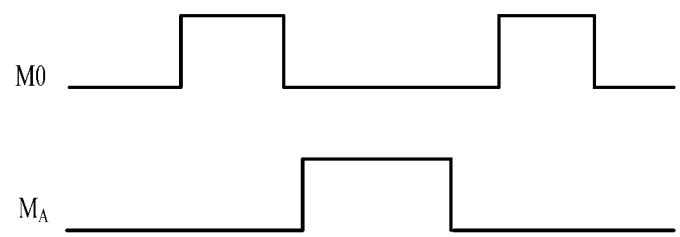
FIG. 2 is a schematic diagram of a control waveform of the active-clamp flyback circuit in the prior art.
Figure 3:
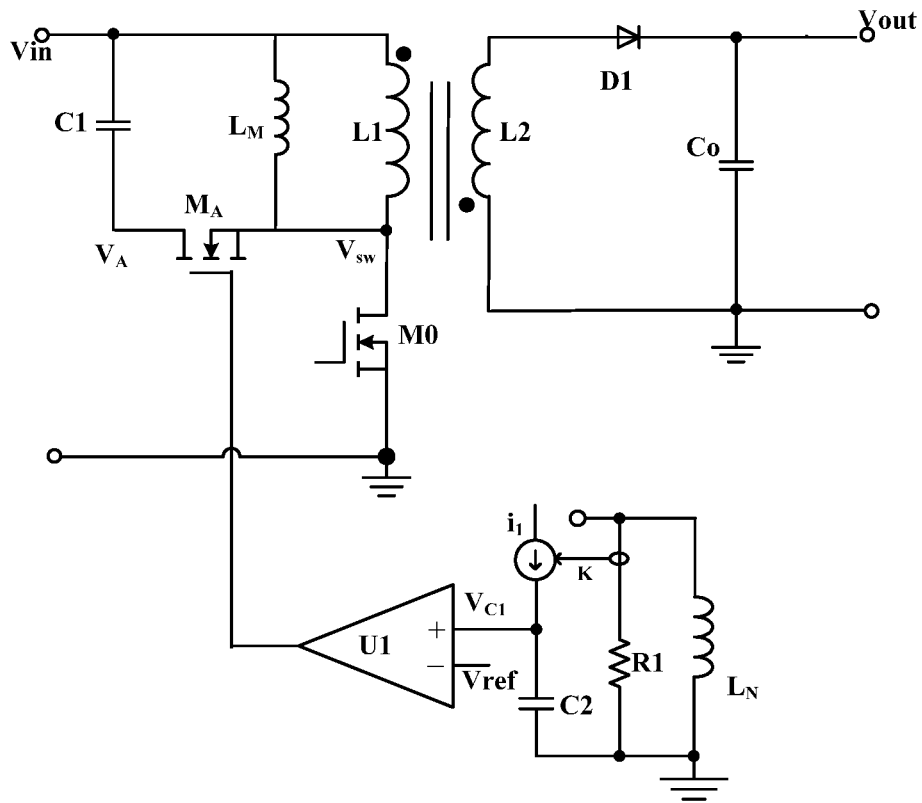
FIG. 3 is a schematic diagram of a circuit structure of the active-clamp flyback circuit in the present invention.

FIG. 3 illustrates a circuit structure of the active-clamp flyback circuit in the present invention, including a main power switch tube M0, a transformer and a secondary rectifier tube D1. The transformer includes a primary winding L1 and a secondary winding L2, and the primary winding L1 includes magnetizing inductor $L_M$. The main power switch tube M0 is connected with the primary winding L1, and the secondary rectifier tube D1 is connected with the secondary winding L2. A primary control circuit controls a switching state of the main power switch tube M0, and the secondary rectifier tube D1 is turned on to freewheeling after the main power switch tube M0 is turned off.

The active-clamp flyback circuit further includes a first capacitor C1 and a first switch tube $M_A$. One end of the first capacitor C1 is connected with a high potential end of an input power supply, the other end is connected with a first end of the first switch tube $M_A$, and a second end of the first switch tube $M_A$ is connected with a common end of the main power switch tube M0 and the primary winding L1.

A turn-off moment of the first switch tube $M_A$ is adjusted according to time when the main power switch tube M0 is turned on and the first switch tube $M_A$ is turned off and voltages at both ends of the magnetizing inductor $L_M$. It is realized by mainly using a volt-second balance, and the detail is: the voltage of the magnetizing inductor $L_M$ being Vin-Vsw when the main power switch tube M0 is turned on and the first switch tube $M_A$ is turned off, and the voltage of the $L_M$ being VA when the main power switch tube M0 is turned off and the first switch tube $M_A$ is turned on. The turn-off time of the $M_A$ is determined by the volt-second balance of the voltage of the $L_M$.

It is realized through the switch tube control circuit. As shown in FIG. 3, the switch tube control circuit includes a second capacitor C2 configured to detect the voltages at both ends of the magnetizing inductor $L_M$ and to obtain a current signal representing the voltages at both ends of the magnetizing inductor $L_M$. The current signal charges the second capacitor C2 during a period when the main power switch tube M0 is turned on and the first switch tube $M_A$ is turned off, and the current signal discharges the second capacitor C2 when the main power switch tube M0 is turned off and the first switch tube $M_A$ is turned on. During the discharging process, when a voltage of the second capacitor C2 drops to a reference signal Vref, the first switch tube $M_A$ is controlled to be turned off.

The present invention mainly aims at two working modes of the active-clamp flyback circuit, that is a boundary conduction mode (BCM) and a discontinuous conduction mode (DCM). When the active-clamp flyback circuit is determined to work at the BCM or DCM, the turn-off moment of the first switch tube can be controlled by using the volt-second balance so as to reduce the power consumption. Further, it also needs to determine the BCM or DCM, that is, to determine whether it belongs to the BCM or DCM, as there are different ways to reduce the power consumption in different working modes. The way to determine the BCM or DCM is as follows: time from the turn-off moment of the first switch tube to a turn-on moment of the main power switch tube being first time. When the first time reaches threshold time, the active-clamp flyback circuit is determined to work in the discontinuous conduction mode, otherwise, it is the boundary conduction mode.

There are many ways to realize the detection of the voltages at both ends of the magnetizing inductor $L_M$, and the auxiliary winding is used in this embodiment. The switch tube control circuit further includes an auxiliary winding $L_N$, a first resistor R1 and a comparison circuit U1. The auxiliary winding $L_N$ is coupled with the transformer, the first resistor R1 is connected with the auxiliary winding L2 to sample a voltage of the auxiliary winding $L_N$, and a voltage of the first resistor R1 characterizes the voltages at both ends of the magnetizing inductor $L_M$. A current of the first resistor R1 is sampled. The specific implementation is, a current source it being adjusted by the sampled current. For example, it is adjusted through a ratio K to obtain the current signal representing the voltages at both ends of the magnetizing inductor $L_M$. The current signal is input to the second capacitor C2, a voltage of the second capacitor C2 is input to a first input end of a comparison circuit U1, and the reference signal Vref is input to a second input end of the comparison circuit U1. An output end of the comparison circuit U1 is connected to a control end of the first switch tube $M_A$. The principle of the circuit mainly uses the form of charging and discharging to the capacitor. According to the time when the main power switch tube M0 is turned on and the first switch tube $M_A$ is turned off and the voltages at both ends of the magnetizing inductor $L_M$, the turn-off moment of the first switch tube $M_A$ is adjusted to release energy of the drain of the first switch tube $M_A$ so as to reduce the turn-on loss. After the first switch tube is turned off and before the main power switch tube is turned on, voltages at both ends of the second capacitor are kept to be equal to an initial voltage. The initial voltage is a set value which can be set according to an actual application. For example, in the discontinuous conduction mode, the magnetizing inductor $L_M$ does not need the negative current, otherwise the conduction loss will increase. Therefore, the initial voltage can be set to be equal to the reference signal, such that the magnetizing inductor does not have the negative current before the main power switch tube is turned on, which is beneficial to reduce the conduction loss; and in the continuous conduction mode, the magnetizing inductor $L_M$ is controlled to have a slight negative current before the main power switch tube is turned on. The negative current is used to discharge to Vsw to reduce the turn-on loss of the M0. Therefore, the initial voltage may be set slightly larger than the reference signal so as to achieve the slight negative current of the $L_M$.

For the DCM, as there is no need to control the value of the negative current of the magnetizing inductor $L_M$, the above-mentioned circuit and method can achieve better technical effects. For the BCM, the value of the negative current can be controlled through further technical means to achieve more accurate adjustment.

In FIG. 3, the output end of the comparison circuit U1 is connected with the control end of the first switch tube $M_A$ only for the convenience of illustration. In practice, the two are not necessarily directly connected, and the middle has a control conversion circuit or a logic conversion circuit and so on. This is explained here.

When the present invention is working in the BCM, in order to avoid a too large negative current to generate the energy loss after the first switch tube $M_A$ is turned off, so it is determined through a reducing rate of the voltage of the common end of the main power switch tube and the primary winding. If the negative current is too large after the $M_A$ is turned off, the reducing rate of the voltage of the common end is relatively large. There are at least two means which can carry out determination. Firstly, it is determined according to the voltage change rate $$\frac{dv}{dt}$$

at the voltage Vsw of the common end. When the voltage or the voltage change rate is lower than the corresponding threshold, as the voltage change rate at this voltage is a negative value, although its absolute value is relatively large, it is still treated as a negative number at this time. When it is lower than the corresponding threshold, a turn-off moment of a next cycle of the first switch tube is advanced. Secondly, a time period is preset, during which if the voltage Vsw of the common end is lower than the corresponding threshold, the turn-off moment of the next cycle of the first switch tube is advanced. The above-mentioned two methods are different from the specific applicable circuit, but the essence is to detect the voltage change rate, so as to achieve that before the main power switch tube M0 is turned on, the magnetizing inductor $L_M$ has the negative current and the negative current is not too large which can be just used for discharging for the voltage Vsw, reducing the turn-on loss of the main power switch tube M0 and not increasing the conduction loss. It is reflected in the circuit in FIG. 3, that is, when the reducing rate $$\frac{dv}{dt}$$

of the voltage Vsw reaches a certain threshold or when the voltage Vsw reaches a certain threshold during time period is preset, the value of the negative current is determined to be too large, the value of the reference signal Vref is increased so as to make the turn-off moment of the next cycle of the first switch tube advanced and the negative current smaller. The above only introduces under the condition that it is lower than the corresponding threshold, the turn-off moment of the next cycle of the first switch tube can be delayed when it is higher than the corresponding threshold. That is, when the voltage or the voltage change rate of the common end of the main power switch tube and the primary winding is lower than the corresponding threshold, the turn-off moment of the first switch tube is advanced by increasing the reference signal; and when the voltage or the voltage change rate of the common end of the main power switch tube and the primary winding is higher than the corresponding threshold, the turn-off moment of the first switch tube is delayed by reducing the reference signal.

Figure 4:
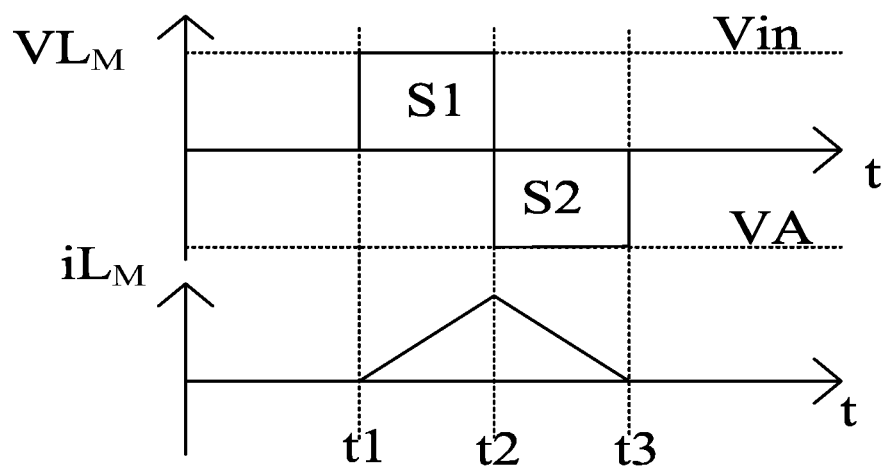
FIG. 4 is a schematic diagram of a waveform of the active-clamp flyback circuit in the present invention.

FIG. 4 illustrates a working waveform of the active-clamp flyback circuit in the present invention. The volt-second balance is shown in FIG. 4 as S1=S2, S1 and S2 are the areas of the corresponding regions, respectively, and the current $iL_M$ in FIG. 4 is the current flowing through the $L_M$. Due to the characteristics of the volt-second balance, the current of $iL_M$ at t1 is equal to the current of $iL_M$ at t3, and t3 is the turn-off moment of the first switch tube. The waveforms of the voltage value and current value in the diagrams are all illustrations. In practice, the current $iL_M$ does not necessarily change linearly, and the voltage $VL_M$ of the magnetizing inductor $L_M$ is not constant. The illustration in the figure is merely for convenience of illustration and does not constitute limitation to the present invention. Except the way of adjusting the reference signal, it can be achieved by adjusting the capacitance of the second capacitor or a discharging current of the second capacitor. That is, when the voltage or the voltage change rate of the common end of the main power switch tube and the primary winding is lower than the corresponding threshold, the turn-off moment of the first switch tube is advanced by reducing the capacitance of the second capacitor or increasing the discharging current of the second capacitor (the proportional coefficient of the current source it controlled by the sampled current is adjusted); and when the voltage or the voltage change rate of the common end of the main power switch tube and the primary winding is higher than the corresponding threshold, the turn-off moment of the first switch tube is delayed by increasing the capacitance of the second capacitor or reducing the discharging current of the second capacitor.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An active-clamp flyback circuit, comprising a main power switch tube, a transformer and a secondary rectifier tube, the transformer comprising a primary winding and a secondary winding, the primary winding comprising magnetizing inductor, the main power switch tube being connected with the primary winding, the secondary rectifier tube being connected with the secondary winding, a primary control circuit controlling a switching state of the main power switch tube, and the secondary rectifier tube being turned on to freewheeling after the main power switch tube is turned off;

the active-clamp flyback circuit further comprising a first capacitor and a first switch tube, one end of the first capacitor being connected with a high potential end of an input power supply, the other end of the first capacitor being connected with a first end of the first switch tube, and a second end of the first switch tube being connected with a common end of the main power switch tube and the primary winding; and wherein a working mode of the active-clamp flyback circuit is determined, if the active-clamp flyback circuit works in a boundary conduction mode or a discontinuous conduction mode, a turn-off moment of the first switch tube is adjusted according to time when the main power switch tube is turned on and the first switch tube is turned off and voltages at both ends of the magnetizing inductor.

2. The active-clamp flyback circuit according to claim 1, wherein the active-clamp flyback circuit further comprises a switch tube control circuit configured to control turn-off of the first switch tube, the switch tube control circuit comprises a second capacitor configured to detect the voltages at both ends of the magnetizing inductor and to obtain a current signal representing the voltages at both ends of the magnetizing inductor, the current signal charges the second capacitor during a period when the main power switch tube is turned on and the first switch tube is turned off, the current signal discharges the second capacitor during a period when the main power switch tube is turned off and the first switch tube is turned on, and during the discharging process, when a voltage of the second capacitor drops to a corresponding reference signal, the first switch tube is controlled to be turned off.

3. The active-clamp flyback circuit according to claim 1, wherein time from the turn-off moment of the first switch tube to a turn-on moment of the main power switch tube is first time, and when the first time reaches threshold time, the active-clamp flyback circuit is determined to work in the discontinuous conduction mode, otherwise, the circuit is determined to work in the boundary conduction mode.

4. The active-clamp flyback circuit according to claim 2, wherein time from the turn-off moment of the first switch tube to a turn-on moment of the main power switch tube is first time, and when the first time reaches threshold time, the active-clamp flyback circuit is determined to work in the discontinuous conduction mode, otherwise, the circuit is determined to work in the boundary conduction mode.

5. The active-clamp flyback circuit according to claim 3, wherein when the active-clamp flyback circuit is working in the boundary conduction mode, after the first switch tube is turned off, a voltage or a voltage change rate of the common end of the main power switch tube and the primary winding is detected, and when the voltage of the common end of the main power switch tube and the primary winding reaches a corresponding threshold after a period of time or the voltage change rate of the common end of the main power switch tube and the primary winding reaches a corresponding threshold after a period of time, a turn-off moment of a next cycle of the first switch tube is advanced or delayed.

6. The active-clamp flyback circuit according to claim 4, wherein when the active-clamp flyback circuit is working in the boundary conduction mode, after the first switch tube is turned off, a voltage or a voltage change rate of the common end of the main power switch tube and the primary winding is detected, and when the voltage of the common end of the main power switch tube and the primary winding reaches a corresponding threshold after a period of time or the voltage change rate of the common end of the main power switch tube and the primary winding reaches a corresponding threshold after a period of time, a turn-off moment of a next cycle of the first switch tube is advanced or delayed.

7. The active-clamp flyback circuit according to claim 2, wherein the switch tube control circuit further comprises an auxiliary winding, a first resistor and a comparison circuit, the auxiliary winding is coupled with the transformer, the first resistor is connected with the auxiliary winding to sample a voltage of the auxiliary winding, a voltage of the first resistor represents the voltages at both ends of the magnetizing inductor, a current of the first resistor is sampled to obtain the current signal representing the voltages at both ends of the magnetizing inductor, the current signal is input to the second capacitor, a voltage of the second capacitor is input to a first input end of the comparison circuit, the reference signal is input to a second input end of the comparison circuit, and an output end of the comparison circuit is connected to a control end of the first switch tube.

8. The active-clamp flyback circuit according to claim 5, wherein after the first switch tube is turned off and before the main power switch tube is turned on, voltages at both ends of the second capacitor are kept to be equal to an initial voltage.

9. The active-clamp flyback circuit according to claim 6, wherein after the first switch tube is turned off and before the main power switch tube is turned on, voltages at both ends of the second capacitor are kept to be equal to an initial voltage.

10. The active-clamp flyback circuit according to claim 5, wherein when the voltage or the voltage change rate of the common end of the main power switch tube and the primary winding is lower than the corresponding threshold, the turn-off moment of the first switch tube is advanced by increasing the reference signal; and when the voltage or the voltage change rate of the common end of the main power switch tube and the primary winding is higher than the corresponding threshold, the turn-off moment of the first switch tube is delayed by reducing the reference signal.

11. The active-clamp flyback circuit according to claim 6, wherein when the voltage or the voltage change rate of the common end of the main power switch tube and the primary winding is lower than the corresponding threshold, the turn-off moment of the first switch tube is advanced by increasing the reference signal; and when the voltage or the voltage change rate of the common end of the main power switch tube and the primary winding is higher than the corresponding threshold, the turn-off moment of the first switch tube is delayed by reducing the reference signal.

12. The active-clamp flyback circuit according to claim 5, wherein when the voltage or the voltage change rate of the common end of the main power switch tube and the primary winding is lower than the corresponding threshold, the turn-off moment of the first switch tube is advanced by reducing capacitance of the second capacitor or increasing a discharging current of the second capacitor; and when the voltage or the voltage change rate of the common end of the main power switch tube and the primary winding is higher than the corresponding threshold, the turn-off moment of the first switch tube is delayed by increasing the capacitance of the second capacitor or reducing the discharging current of the second capacitor.

13. The active-clamp flyback circuit according to claim 6, wherein when the voltage or the voltage change rate of the common end of the main power switch tube and the primary winding is lower than the corresponding threshold, the turn-off moment of the first switch tube is advanced by reducing capacitance of the second capacitor or increasing a discharging current of the second capacitor; and when the voltage or the voltage change rate of the common end of the main power switch tube and the primary winding is higher than the corresponding threshold, the turn-off moment of the first switch tube is delayed by increasing the capacitance of the second capacitor or reducing the discharging current of the second capacitor.

14. A control method for an active-clamp flyback circuit, based on the active-clamp flyback circuit, the active-clamp flyback circuit comprising a main power switch tube, a transformer and a secondary rectifier tube, the transformer comprising a primary winding and a secondary winding, the primary winding comprising magnetizing inductor, the main power switch tube being connected with the primary winding, the secondary rectifier tube being connected with the secondary winding, a primary control circuit controlling a switching state of the main power switch tube, and the secondary rectifier tube being turned on to freewheeling after the main power switch tube is turned off;

the active-clamp flyback circuit further comprising a first capacitor and a first switch tube, one end of the first capacitor being connected with a high potential end of an input power supply, the other end being connected with a first end of the first switch tube, and a second end of the first switch tube being connected with a common end of the main power switch tube and the primary winding; and wherein a working mode of the active-clamp flyback circuit is determined, if the active-clamp flyback circuit works in a boundary conduction mode or a discontinuous conduction mode, a turn-off moment of the first switch tube is adjusted according to time when the main power switch tube is turned on and the first switch tube is turned off and voltages at both ends of the magnetizing inductor.

15. The control method for the active-clamp flyback circuit according to claim 14, wherein the active-clamp flyback circuit further comprises a switch tube control circuit configured to control turn-off of the first switch tube, the switch tube control circuit comprises a second capacitor configured to detect the voltages at both ends of the magnetizing inductor and to obtain a current signal representing the voltages at both ends of the magnetizing inductor, the current signal charges the second capacitor during a period when the main power switch tube is turned on and the first switch tube is turned off, the current signal discharges the second capacitor when the main power switch tube is turned off and the first switch tube is turned on, and during the discharging process, when a voltage of the second capacitor drops to a corresponding reference signal, the first switch tube is controlled to be turned off.

16. The control method for the active-clamp flyback circuit according to claim 14, wherein time from the turn-off moment of the first switch tube to a turn-on moment of the main power switch tube is first time, and when the first time reaches threshold time, the active-clamp flyback circuit is determined to work in the discontinuous conduction mode, otherwise, the circuit is determined to work in the boundary conduction mode.

17. The control method for the active-clamp flyback circuit according to claim 15, wherein when the active-clamp flyback circuit is working in the boundary conduction mode, after the first switch tube is turned off, a voltage or a voltage change rate of the common end of the main power switch tube and the primary winding is detected, and when the voltage of the common end of the main power switch tube and the primary winding reaches a corresponding threshold or the voltage change rate of the common end of the main power switch tube and the primary winding reaches a corresponding threshold after a period of time, a turn-off moment of a next cycle of the first switch tube is advanced or delayed.

* * * * *